United States Patent [19]

McInnes

[11] 3,836,278

[45] Sept. 17, 1974

[54] TAPERED DRILL BIT

[75] Inventor: Alexander G. P. McInnes, Indianapolis, Ind.

[73] Assignee: International Research and Development Corporation, Indianapolis, Ind.

[22] Filed: Dec. 14, 1972

[21] Appl. No.: 315,077

[52] U.S. Cl. .............................. 408/199, 408/223
[51] Int. Cl. ............................................ B23b 51/00
[58] Field of Search ........... 408/223, 224, 225, 211, 408/199

[56] References Cited
UNITED STATES PATENTS

| | | | |
|---|---|---|---|
| 2,442,554 | 6/1948 | Swiatek | 408/199 |
| 3,022,686 | 2/1962 | Rowley | 408/199 |
| 3,076,356 | 2/1963 | Simich | 408/223 |

FOREIGN PATENTS OR APPLICATIONS

| 373,245 | 12/1963 | Sweden | 408/199 |

Primary Examiner—Gil Weidenfeld
Attorney, Agent, or Firm—Woodard, Weikart, Emhardt & Naughton

[57] ABSTRACT

A tapered drill bit for cutting round holes of different diameters in a sheet of material. The bit includes a main body integrally attached to a drive shank, said body and shank having an axis of rotation and being rotatable in a direction of rotation. A slot interrupts the perfectly smooth outer surface of the main body extending from the main body tip rearwardly to an enlarged opposite end. A leading noncutting edge and a trailing cutting edge extend lengthwise along the side of the slot. The slot includes a round undercut surface which extends from the cutting edge beneath the outer surface in a direction opposite the direction of rotation and then back towards the noncutting edge.

2 Claims, 4 Drawing Figures

PATENTED SEP 17 1974 3,836,278

TAPERED DRILL BIT

BACKGROUND OF THE INVENTION

1. Field of the Invention

This invention is in the field of drill bits and more specifically those drill bits which produce round holes of different diameters.

2. Description of the Prior Art

It is desirable to have a single drill bit for forming holes in a sheet of material with the holes having different diameters. Two such drills are disclosed in the U.S. Pat. Nos. 2,897,696 issued to H. R. Tisserant and 3,564,945 issued to H. E. Bradley. Both of these two drills include a plurality of steps positioned along the length of a tapered main body. The holes are quicker and more easily formed with a tapered drill having a smooth outer surface such as disclosed in the U.S. Pat. Nos. 2,965,144 issued to R. B. Loewenthal and 3,076,356 issued to E. Simich. In order to provide a sharp cutting edge on the tapered main body of the drill bit, the cutting edge of the main body is undercut such as disclosed in the aforementioned Simich patent as contrasted to the cutting edge shown in the aforementioned R. B. Loewenthal patent. The Simich cutting tool has a cutting edge which projects outwardly of the main body of the cutting tool. The configuration of the cutting edge disclosed herein allows for the elimination of the back relief for the cutting edge such as shown in the Simich patent thereby reducing the cost of producing the tool.

SUMMARY OF THE INVENTION

One embodiment of the present invention is a tapered drill for cutting round holes of different diameters comprising a main body having a longitudinal axis of rotation extending therethrough, the main body being rotatable about the axis in only a single direction for the cutting of the holes, the body having a drill tip, an opposite end, an outer smooth surface extending rearwardly from the tip, a slot interrupting the surface and extending rearwardly from the tip with the surface being without interruptions except for the slot, the slot forming a noncutting edge and a cutting edge without back relief extending along opposite sides of the slots, the noncutting edge leading the slot as the body rotates in the rotational direction whereas the cutting edge trails the slot as the body rotates in the rotational direction, the noncutting edge and the cutting edge being in the surface and not projecting outwardly therefrom, the slot includes a rounded undercut surface extending from the cutting edge under the outer surface in a direction opposite to the rotational direction and then back toward the noncutting edge, the slot further includes a second surface extending from the rounded surface to the noncutting edge, the cutting edge being sharpened only on the undercut surface and not on the outer surface.

It is an object of the present invention to provide a new and improved tool for cutting round holes of different diameters in a sheet of material.

It is a further object of the present invention to provide a new and improved tapered drill which does not require a back relief for the cutting edge.

A further object of the present invention is to provide a tapered drill having a new and improved cutting edge configuration.

Related objects and advantages of the present invention will be apparent from the following description.

DESCRIPTION OF THE PREFERRED EMBODIMENT

Figure 1:
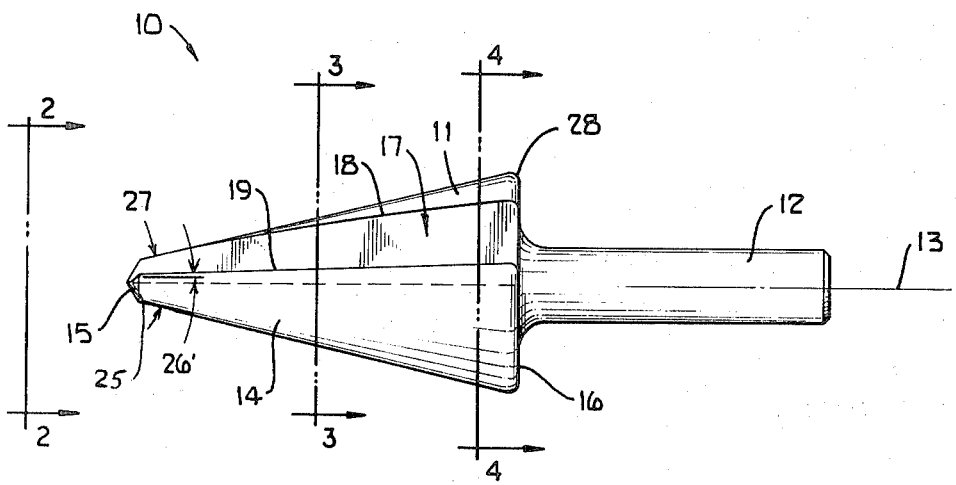
FIG. 1 is a side view of a drill bit incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a tapered drill 10 for cutting round holes of different diameters. The tapered drill has a main body 11 integrally attached to a drive shaft 12. The main body and drive shaft have identical axes of rotation 13 which extend centrally through the drive shaft and the main body. Main body 11 has an outer surface 14 which extends rearwardly from the tip 15 of the main body towards the enlarged opposite end 16.

Figures 2, 3:
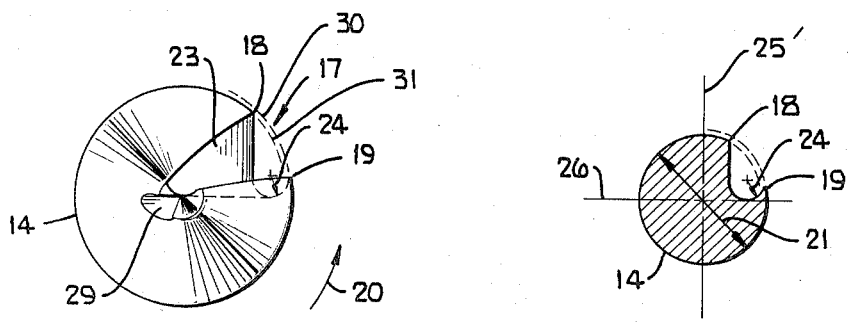
FIG. 2 is an end view looking in the direction of arrows 2—2 of FIG. 1.
FIG. 3 is a cross sectional view taken along the line 3—3 of FIG. 1 and viewed in the direction of the arrows.
Figure 4:
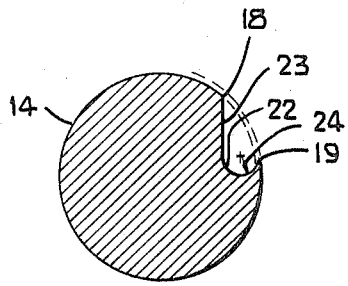
FIG. 4 is a cross sectional view taken along the line 4—4 of FIG. 1 and viewed in the direction of the arrows.

A slot 17 interrupts surface 14 and extends rearwardly from tip 15. The slot forms a noncutting edge 18 and a cutting edge 19 which extends along the opposite sides of the slot. In order to cut a hole with the tool bit shown in the drawings, the main body must be rotated in only one direction as shown in FIG. 2 by arrow 20. Thus, the noncutting edge 18 leads slot 17 when the drill bit is rotated in the direction of arrow 20 whereas the cutting edge 19 trails the slot as the drill is rotated in the direction of arrow 20. As shown in FIGS. 2 through 4, the noncutting edge 18 and the cutting edge 19 are both in the surface 14 of the main body and do not project outwardly therefrom.

Slot 17 includes a rounded undercut surface 22 which extends from cutting edge 19 and under surface 14 in a direction opposite to the direction of rotation 20. Rounded surface 22 then extends back towards the noncutting edge 18 being joined to flat surface 23 at a tangential point. Rounded surface 22 is formed by a single radius 24 which is constant along the length of slot 17.

As shown in FIG. 1, tip 15 converges towards axis 13 at an angle greater than surface 14 thereby providing a sharp drill point. Flat surface 23 has a length which extends from edge 18 to a tangent with surface 22 and linearly decreases from end 16 to the start 25 of tip 15. Flat surface 23 is parallel to a plane 25' which extends through the main body. Plane 25' is perpendicular to a second plane 26 which also extends through the main body. Axis of rotation 13 extends along the intersection of planes 25 and 26. Cutting edge 19 intersects the horizontal at the start 25 of tip portion 15 and extends upwardly therefrom as viewed in FIG. 1 at an angle 26' of 2°. The outer surface while rotating forms a cone of revolution having an included angle 27 of 26°.

In certain cases, the main body of the drill bit will be forced completely through the sheet of material being drilled. As a result, the circumferential edge 28 of end 16 is rounded to facilitate the removal of the main body from the sheet of material. Due to the positioning of slot 17, the drill is heavier as viewed in FIG. 3 on the left side of plane 25' than on the right side of plane 25'. To compensate, the main body has a portion removed therefrom adjacent tip 15 as shown at location 29 on the side of the body opposite slot 17.

Superior cutting is also achieved due to the hollow ground cutting edge 19. In order to produce the configuration of the main body, the main body may be cam ground to achieve the desired shape. The drill may be produced from high carbon steel. Since the cutting edge does not have a back relief in the outer surface of the main body, the drill bit is economical to produce. In the embodiment shown in the drawing, the cutting edge is sharpened only on the inside surface formed by radius 24. The outer surface 14 of the main body smoothly curves inwardly or has a radial relief or helical shape all along its length as indicated by the dotted lines 30 and 31 in FIG. 2 and the similar dotted lines in FIGS. 3 and 4. The radial relief is smooth and constant in a direction opposite of arrow 20 around the main body from edge 19 and back to a position along side to edge 19 where a complete revolution would position the outer surface. That is, the distance between lines 30 and 31 is 0.010 inches which is the amount of radial relief for 360°. Line 31 represents a smooth continuation of the surface 14 at the edge 28.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A tapered drill for cutting round holes of different diameters comprising:

a main body having a longitudinal axis of rotation extending therethrough, said main body being rotatable about said axis in only a single direction for the cutting of said holes, said body having a drill tip, an opposite end, an outer smooth surface extending rearwardly from said tip, a slot interrupting said surface and extending rearwardly from said tip with said surface being without interruptions extending from said tip to said opposite end except for said slot, said slot forming a noncutting edge and a cutting edge without back relief extending along opposite sides of said slot, said noncutting edge leading said slot as said body rotates in said rotational direction whereas said cutting edge trails said slot as said body rotates in said rotational direction, said noncutting edge and said cutting edge being in said surface and not projecting outwardly therefrom, said slot including a rounded undercut surface extending from said cutting edge under said outer surface in a direction opposite to said rotational direction and then back toward said noncutting edge, said slot further including a second surface extending from said rounded surface to said noncutting edge; said cutting edge extending from said tip to said opposite end in the direction of said rotation;

a drive shaft integrally attached to said main body at said opposite end and being coaxial with said axis of rotation;

said cutting edge is sharpened only on said undercut surface and not on said outer surface;

said opposite end includes a rounded circumferential edge;

said rounded surface is formed of a single radius which is constant along the length of said slot;

said second surface is a flat surface;

said tip diverges away from said axis at an angle greater than said outer surface, said second surface has a length extending from said rounded surface to said noncutting edge which linearly decreases from said opposite end towards said tip, said second surface being tangent with a portion of said rounded surface, said main body has a first plane and a second plane, said first plane intersects said second plane at a right angle and along the length of said axis of rotation, and said second surface is parallel with said first plane along the length of said axis of rotation with said cutting edge intersecting the horizontal at an angle of 2°.

2. The tapered drill of claim 1 wherein:

said main body has said slot located on one side of said first plane, said main body has a portion removed therefrom adjacent said tip on a side of said first plane opposite said one side and said slot providing a discontinuous surface.

* * * * *